(12) United States Patent
Hans et al.

(10) Patent No.: US 6,928,288 B2
(45) Date of Patent: Aug. 9, 2005

(54) DEVICE AND METHOD FOR SETTING UP A SUBSEQUENT CONNECTION FOR DATA TRANSMISSION VIA A MOBILE TELECOMMUNICATIONS SYSTEM, AFTER THE TERMINATION OF THE FIRST CONNECTION

(75) Inventors: Martin Hans, Hildesheim (DE); Frank Kowalewski, Salzgitter (DE); Josef Laumen, Hildesheim (DE); Gunnar Schmidt, Wolfenbuettel (DE); Siegfried Baer, Pforzheim (DE); Mark Beckmann, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 382 days.

(21) Appl. No.: 10/018,656
(22) PCT Filed: Mar. 28, 2001
(86) PCT No.: PCT/DE01/01179

§ 371 (c)(1),
(2), (4) Date: May 10, 2002

(87) PCT Pub. No.: WO01/80585

PCT Pub. Date: Oct. 25, 2001

(65) Prior Publication Data

US 2002/0177445 A1 Nov. 28, 2002

(30) Foreign Application Priority Data

Apr. 19, 2000 (DE) .......................................... 100 19 402

(51) Int. Cl.[7] .................................................. H04Q 7/20
(52) U.S. Cl. .................... 455/450; 455/452.2; 455/509; 370/329
(58) Field of Search .................... 455/450, 452.1–452.2, 455/509, 525; 370/329

(56) References Cited

U.S. PATENT DOCUMENTS

| 5,428,823 A | * | 6/1995 | Ness-Cohn et al. | .......... 455/518 |
| 5,852,781 A | * | 12/1998 | Ahvenainen | ................ 455/509 |
| 6,223,041 B1 | * | 4/2001 | Egner et al. | ............. 455/452.2 |
| 6,314,292 B1 | * | 11/2001 | Ho et al. | .................... 455/450 |
| 6,374,112 B1 | * | 4/2002 | Widegren et al. | ......... 455/452.2 |
| 6,418,148 B1 | * | 7/2002 | Kumar et al. | ................ 370/468 |
| 6,442,151 B1 | * | 8/2002 | H'mimy et al. | ............. 370/333 |
| 6,466,795 B1 | * | 10/2002 | Ahn | ........................... 455/450 |
| 6,718,179 B1 | * | 4/2004 | Forssell et al. | ............. 455/509 |
| 6,721,568 B1 | * | 4/2004 | Gustavsson et al. | ........ 455/450 |

FOREIGN PATENT DOCUMENTS

| DE | 199 39 571 A | 3/2000 |
| WO | 99 21385 A | 4/1999 |

* cited by examiner

*Primary Examiner*—William Trost
*Assistant Examiner*—Sharad Rampuria
(74) *Attorney, Agent, or Firm*—Michael J. Striker

(57) ABSTRACT

A method and a corresponding apparatus for an additional call setup for data transmission between a second data receiver 2' and a data transmitter 1 via at least one mobile telecommunications system 3 includes the following steps: allocation of resources of the air interface 30 to the data transmitter 1, and construction of a certain configuration of the data transmitter 1 by means of the controller device 31 in the first call setup; storing the resource occupation and configuring the data transmitter 1 of the first call setup in the memory device 10 of the data transmitter 1; and sending an identification message 7 from the controller device 31 to the data transmitter 1 in the additional call setup, to call up the resource occupation and configuration of the data transmitter 1, stored in the memory device 10, for a new allocation thereof in the additional call setup.

11 Claims, 2 Drawing Sheets

DEVICE AND METHOD FOR SETTING UP A SUBSEQUENT CONNECTION FOR DATA TRANSMISSION VIA A MOBILE TELECOMMUNICATIONS SYSTEM, AFTER THE TERMINATION OF THE FIRST CONNECTION

BACKGROUND OF THE INVENTION

The present invention relates to an apparatus and a method for an additional call setup for data transmission between a second data receiver and a data transmitter via at least one mobile telecommunications system, in which between the data transmitter and the second or a first data receiver, a first call setup has already taken place within a certain time period in the past.

Although applicable to arbitrary mobile types of data transmission over arbitrary data terminal devices, the present invention and the problems it seeks to solve will be explained here in terms of a telephone call made by a mobile telephone.

For a call setup for data transmission between two data terminal devices, the data transmitter and data receiver must be allocated certain physical resources, which in the mobile telecommunications system are available via an air interface connection. As a rule, this allocation takes place in a logical controller device, which in a mobile telecommunications system is usually called an RRC (Radio Resource Control) device. This device manages the physical resources of a transmission channel of the mobile telecommunications system.

In telecommunications systems that employ a CDMA (Code Division Multiple Access) method, which can be used for channel access, for instance in cellular systems for mobile radio, such as a UMTS (Universal Mobile Telecommunication System) system, a physical resource is defined either as a combination of a CDMA code and a carrier frequency of the applicable transmission channel, or else a third component—time—is added. In the first case, the term FDD mode (Frequency Division Duplex) is used, and in the latter, TDD mode (Time Division Duplex); that is, a radio resource of the transmission channel of the mobile telecommunications system is defined as a combination of a CDMA code, a carrier frequency, and a time slot.

Which ones of the still-available resources are allocated by the controller device to which data transmitter, in particular a mobile telephone, and how this allocation is carried out, are forwarded by the controller device by means of appropriate signaling to the data transmitter from which the applicable request had come. For UMTS systems, for instance, an applicable protocol for this signaling is defined with certain information elements.

Also in UMTS systems, a plurality of levels of protocols are defined, which are each addressed by the controller device.

In principle, for every mobile data transmitter and data receiver or mobile station, different logical channels (radio bearers), that is, channels inside the applicable mobile station, are processed with suitable data identification, advantageously in levels 2 and 3 of a UMTS protocol, and are sent on to the level 1 of the UMTS protocol in the form of various transport channels. This level 1 copies the transport channels onto various physical channels, that is, channels for instance of different frequency, with different code or time slots, or any combination of these three factors. These physical channels represent the radio resources. The execution of the copying in the various levels is defined unambiguously by the controller device in the mobile telecommunications system upon a call setup.

Thus each time a call is set up, the allocation of radio resources and the copying of logical channels onto transport channels onto physical channels must be forwarded completely and unambiguously from the mobile telecommunications system to the applicable mobile data transmitter. To that end, the signaling protocol is filled with a high number of signaling or information elements.

However, it often happens that a user of mobile telephone for instance completes a first telephone call, so that the first call setup is brought to a close, only to initiate a further telephone call shortly thereafter, for which he requires an additional call setup.

For such an additional call setup, in the prior art the fact that in the second, third and successive call setup for a second, third and successive telephone call, for instance, the resources that have just been released are needed again and must therefore be completely re-allocated, has proved to be disadvantageous.

The same is true for the internal configuration of the corresponding mobile data transmitter, since upon a new allocation of radio resources, a new internal setting of the applicable mobile data transmitter must also be performed.

Thus each time a call setup is newly made, a certain data traffic occurs over the air interface, which reduces the transmission capacity for the actual transmission data or user data.

Accordingly, the object of the present invention is generally to furnish a new call setup for data transmission and with a reduced data occurrence of signaling information.

SUMMARY OF THE INVENTION

The method according to the invention for an additional call setup and the corresponding apparatus have the advantage over the known counterparts that a new call setup takes place substantially faster, and the transmission capacity of the air interface for the actual transmission data of the user is increased.

The fundamental concept of the present invention is that the data transmitter has at least one memory device, and the mobile telecommunications system has at least one air interface and a controller device, and that the following steps are performed:

allocation of resources of the air interface to the data transmitter, and construction of a certain configuration of the data transmitter by means of the controller device in the first call setup;

storing the resource occupation and configuring the data transmitter of the first call setup in the memory device of the data transmitter; and sending an identification message from the controller device to the data transmitter in the additional call setup, to call up the resource occupation and configuration of the data transmitter, stored in the memory device, for a new allocation thereof in the additional call setup.

This makes it possible in an additional call setup for the data transmitter to occupy exactly the same resources in a "new call", so that a completely new allocation of these resources by the controller device of the telecommunications system is no longer necessary; instead, only an identification message is needed to call up the "old" resources and configuration.

Since an identification message has a substantially smaller quantity of data than the original resource occupation and configuration message for the data transmitter, the signaling and hence the non-"usable" data traffic on the air interface can be reduced. This is because instead of repeatedly signaling which resources are to be used for transmitting the applicable transmission data and which configurations are to be set at the data transmitter, the signaling is restricted solely to informing the data transmitter of the resources which were used for the previous call setup and which are again available in the same configuration.

In a preferred refinement, the memory device of the data transmitter is embodied as a temporary memory device. As a result, the corresponding resources or the corresponding configuration can be stored in memory for a predetermined length of time in the data transmitter; because the storage is purely temporary, a smaller memory device suffices and thus less space is needed.

In a further preferred refinement, the mobile telecommunications system is embodied as a UMTS system.

In a further preferred refinement, the data transmitter is embodied as a mobile telephone. This is the most frequently used form of mobile data transmitter, but other data transmitters are also in use.

In a further preferred refinement, the resources, for instance in a UMTS system, are defined as a combination of a CDMA code, a triple frequency and optionally a time slot of a corresponding transmission channel. Other definitions of the resources to be allocated are equally conceivable.

In a further preferred refinement, resources that have just been released are not allocated by the controller device until no other resources are available any longer. This means that resources that have just been released will not be assigned to other users of the mobile telecommunications system for as long as possible; instead, first the other free resources on the transmission channel are allocated. Thus the resources that have been held back for a certain period of time can be accessed again as needed.

In a further preferred refinement, the resources that were released longer ago are re-allocated by the controller device first. This allocation of resources by the FIFO (First In, First Out) principle represents an appropriate strategy of radio resource management.

In a further preferred refinement, an acknowledgment message sent by the controller device to the data transmitter is acknowledged by the latter to confirm correct resource allocation. Thus erroneous resource allocation is detected and corrected, and provision is made for an error-free call setup.

In a further preferred refinement, the instant of callup of the resource occupation and configuration of the data transmitter, stored in the memory device of the data transmitter, for a new allocation thereof in the additional call setup is predetermined. Especially for packet-switched services, in which the data are transmitted in packets or bursts, with predetermined intervals between the individual data bursts, indicating an activation time is appropriate.

BRIEF DESCRIPTION OF THE DRAWINGS

Exemplary embodiments of the invention are shown in the drawings and explained in further detail in the ensuing description.

Shown are.

DETAILED DESCRIPTION OF THE PREFERRED EMBODIMENTS

Figure 1:
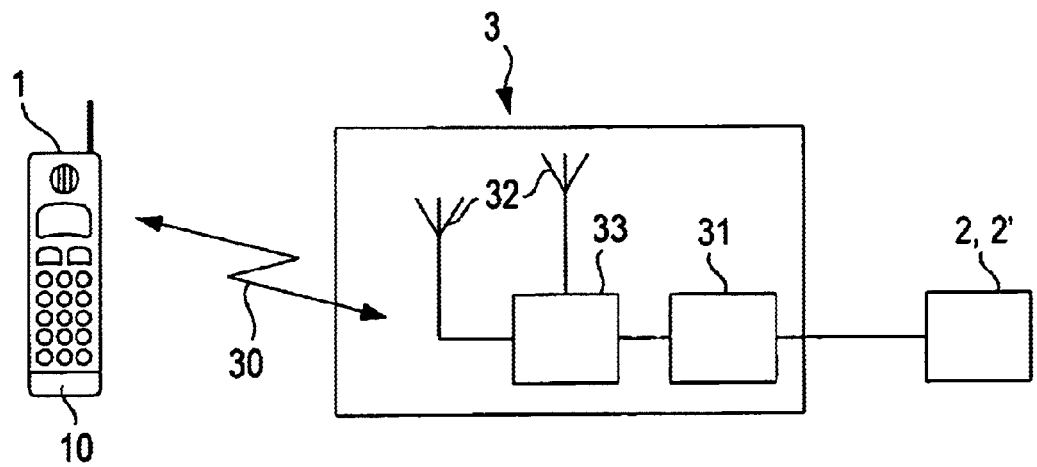
FIG. 1, a block circuit diagram of a transmission architecture for a call setup via a mobile telecommunications system, in one exemplary embodiment of the present invention.

In the drawings, the same reference numerals identify the same or functional identical components.

FIG. 1 is a block circuit diagram of an apparatus for an additional call setup for data transmission via a mobile telecommunications system 3, in one exemplary embodiment of the present invention. In addition to the usual components, the mobile telecommunications system 3 also has at least one controller device, a so-called RRC (Radio Resource Control) device 31, and a transmitter 33. By means of the transmitter, both connection- and packet-oriented data can be transmitted from a base station 32 of the telecommunications system 3 via an air interface 30, for instance to a mobile telephone 1 for a call setup.

A data set passes through certain protocol structures. A call setup for a data transmission between the mobile telephone 1, which has a temporary memory device 10, and a data transmitter 2; 2', for instance in the case of a telephone call a further mobile telephone, is established via the mobile telecommunications system 3. The mobile telecommunications system 3 is preferably embodied as a UMTS system.

In this UMTS system, as already noted above, the physical resources are defined as a combination of a CDMA code and a carrier frequency of the transmission channel, or additionally time. In operation, accordingly a radio resource of a radio channel is embodied as a combination of a CDMA code, a carrier frequency, and optionally a time slot.

Figure 2:
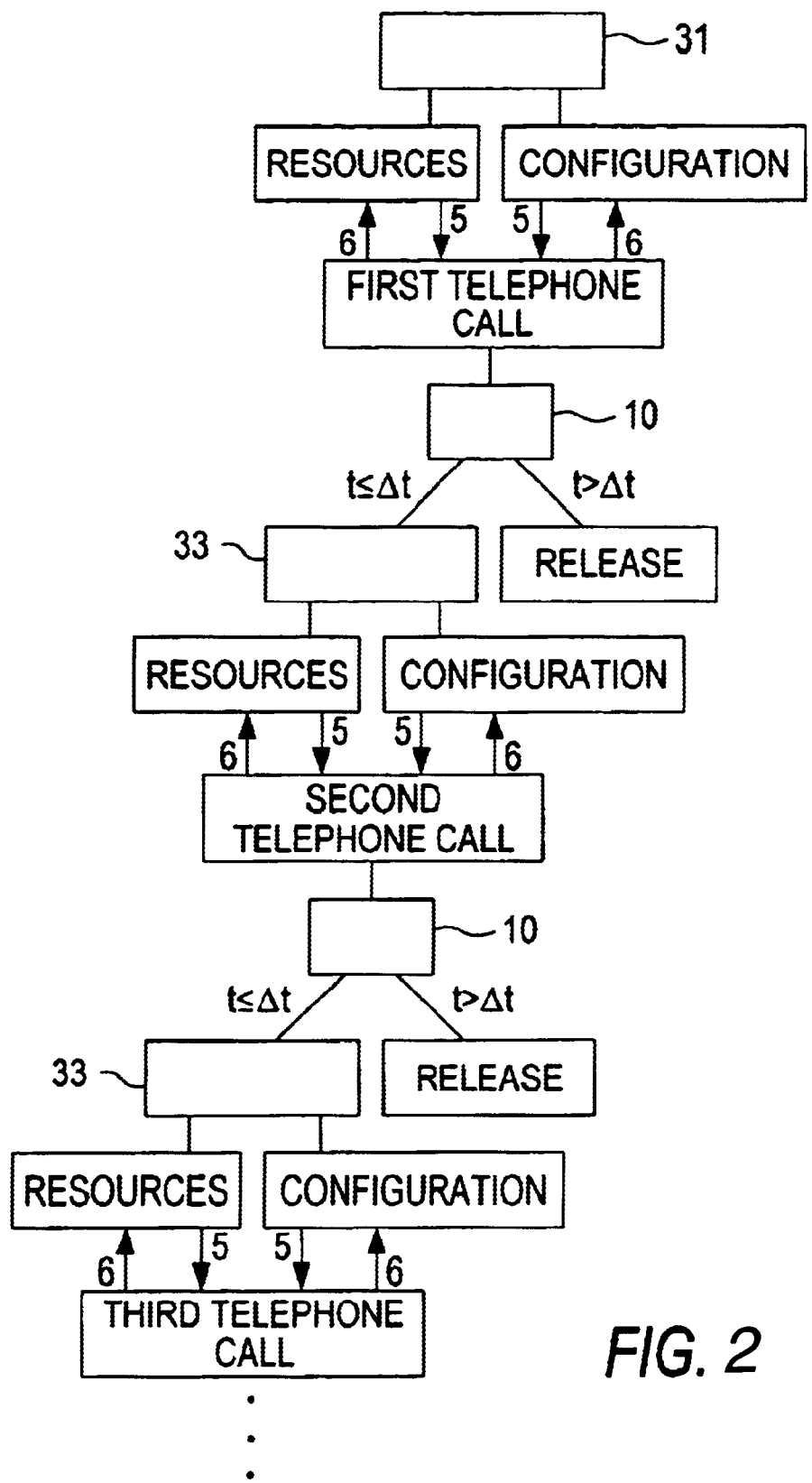
FIG. 2, a flowchart of a method for an additional call setup, in one exemplary embodiment of the present invention.

FIG. 2 shows a flowchart of a method for successive call setup operations, in which after a first call setup has ended, for instance between the mobile telephone 1 and a first mobile telephone 2 as a data receiver, additional connection are set up between the mobile telephone 1 and the first data transmitter 2 again, or an arbitrary second data transmitter 2'.

If a mobile radio user wants to make a telephone call after a certain period of time Δt of non-use of the mobile telephone 1, then at the beginning of the call setup, which will be considered here to be the first time a call setup is made, certain physical resources of the air interface 30 of the mobile telecommunications system 3 are allocated to the mobile telephone 1 of the user by means of the RRC device 31. Before the actual first call, a signaling is sent from the RRC device 31 to the mobile telephone 1 by the transmitter 33, saying which still-available resources are to be used for transmitting the corresponding data, how the corresponding data are to be received or sent and further processed, and what internal configuration of the mobile telephone 1 is to be set for the purpose. Certain process units must be called up, which actuate the settings or configurations of the mobile telephone 1.

Figure 3:
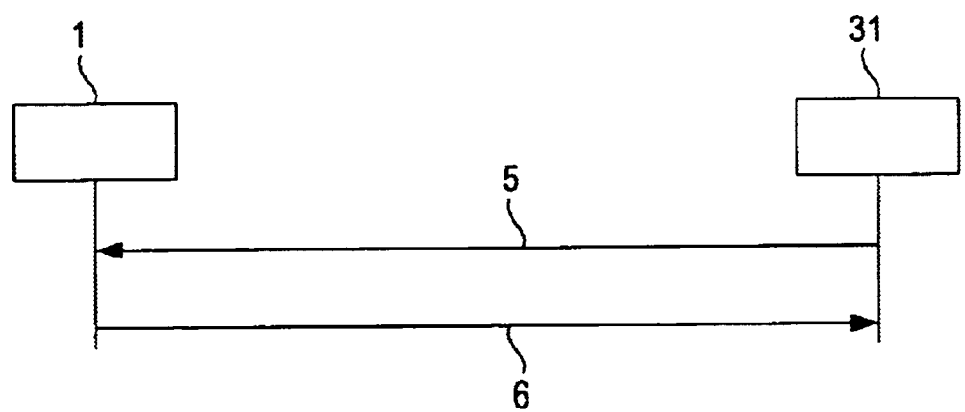
FIG. 3, a schematic view of an acknowledgment process of the allocated resources, in one exemplary embodiment of the present invention.

In FIG. 3, the principle of acknowledging error-free reception of the resource allocation and the configuration setting is illustrated schematically.

For performing an error-free allocation of radio resources and the corresponding configurations, an acknowledgment message 5 is sent from the RRC device 31 to the mobile telephone 1 via the transmitter 33. Upon correct reception of the radio resource allocation and the configuration setting, the mobile telephone 1 sends a re-acknowledgment message 6 to the RRC device 31 for acknowledgment. If a re-acknowledgment message 6 is not received within a predetermined length of time, or if an error report is received, then the process of allocating the radio resources and setting the configuration and the sending of an acknowledgment message 5 is repeated until such time as a re-acknowledgment message 6 confirms the reception of the required data for an error-free call setup.

Once the first telephone call is completed, the configuration set for it and the allocated resources are stored in a temporary memory device 10 of the mobile telephone 1 for a predetermined length of time Δt. This memory time should advantageously be selected such that it is longer than or equal to the period of time within which all the remaining resources of the air interface 30 of the mobile telecommunications system 3 are also allocated to data transmitters. Specifically, then the resources used for the first telephone call of the mobile telephone 1 cannot be held back any longer and are released for assignment elsewhere.

After a release of the resources allocated in the first telephone call, there is no longer any need for storage in the temporary memory device 10 of the mobile telephone 1.

If the mobile radio user of the mobile telephone 1, after completing the first telephone call, initiates a further telephone call within the time period Δt, then he requires the same quality of radio resource again, that is, the same quality of transmission or speech connection. He requires precisely the same resources once again that he has just released upon completing the first telephone call.

Since in a new call setup within the period Δt the previously allocated resources and configuration settings are still stored in the temporary memory device 10 of the mobile telephone 1, now only an identification message 7 is sent from the RRC device 31 by the transmitter 33 to the mobile telephone 1, and the resource occupation and configuration of the mobile telephone 1 stored in the memory device 10 is called up for a re-allocation thereof for the second call setup. That is, as long as the previously occupied resource has not been reassigned by the mobile radio network to some other mobile radio user between the "hanging up" and a "new call", the mobile telephone 1 in the "new call" can again occupy exactly the same resources, that is, the frequency, code, and optionally time slot. Thus a completely new allocation of resources by the RRC device 31 is unnecessary.

The necessary elements of an identification message are reduced considerably compared to the necessary elements of the signaling message stating what resources are to be used, and so in the new call setup, fewer signaling data appear at the air interface 30.

Analogously to the first call setup, along with the identification message 7 an acknowledgment message 5 is sent by the RRC device 31 to the mobile telephone 1, and the reception of the identification message 7 in the case where there is no error is confirmed by means of a re-acknowledgment message 6 to the RRC device 31.

Analogously to the first call setup, the original resources, called up for the second call setup, and the configuration setting are re-stored temporarily in the temporary memory device 10 of the mobile telephone 1. The steps already mentioned are performed once again, and one proceeds analogously.

This procedure can be repeated as needed, for instance for a third telephone call with a third conversation partner.

For the mobile telecommunications system 3, it is recommended that the so-called FIFO principle (First In, First Out) be employed. With this principle, resources whose release was longer ago than the release of other resources are reassigned first, before the resources whose release was more recent are re-distributed. Thus in the present exemplary embodiment, the resources and configurations of the mobile telephone 1 allocated to the mobile telephone 1 for the first telephone call, for instance, are not assigned to another mobile radio user, after the first connection has been disconnected, until there are no longer any available resources that were released longer ago.

The essential advantages of the present invention reside in the economy in terms of signaling information that has to be transmitted in the additional call setup by the telecommunications system to the mobile telephone. Instead of the complete signaling of which resources are to be used in an additional call setup, the signaling of the identification message is restricted to instructing that the same "old" configuration and the same "old" resources are to be used again.

The economy of signaling has two favorable effects.

First, this kind of new call setup can take place substantially faster than if the complete configuration is imparted again. In the prior art, the duration of an additional call setup in a GSM system takes about ten to twenty seconds, because of the necessity for complete signaling. When the resources and configuration stored in memory are called up by the identification message 7, an additional call setup takes place in approximately a fraction of a second.

Second, less signaling means less data traffic at the air interface; that is, the transmission capacity of the air interface for the actual user data is increased.

Although the present invention has been described above in terms of a preferred exemplary embodiment, it is not limited to that but instead can be modified in manifold ways.

The method described above is for instance excellently well suited to packet-switched services, since in these services the data are generally available in packets for transmission. Instead of repeated signaling of which resources are to be used for transmitting the applicable data packet, the signaling can now be limited to informing the mobile telephone 1 that the resources already used for the previous data packet are still available and can be used in the same configuration. By means of an identification message 7, which occupies only a small region in the transmission capacity of the air interface 30 because fewer information elements are necessary, these information elements are reactivated.

In packet-oriented data transmission, an instant of reactivation of the "old" configuration and resource occupation is advantageously indicated. As a result, fast, error-free packet-oriented data transmission is assured.

What is claimed is:

1. A method for an additional call setup for data transmission between a second data receiver (2') and a data transmitter (1) via at least one mobile telecommunications system (3), in which between the data transmitter (1) and the second data receiver (2') or a first data receiver (2), a first call setup has already taken place within a certain time period Δt in the past, and wherein the data transmitter (1) has at least one memory device (10), and the mobile telecommunications system (3) has at least one air interface (30) and one controller device (31), having the following steps;

allocation of resources of the air interface (30) to the data transmitter (1), and construction of a certain configuration of the data transmitter (1) by means of the controller device (31) in the first call setup;

storing the resource occupation and configuration of the data transmitter (1) of the first call setup in the memory device (10) of the data transmitter (1); and sending an identification message (7) from the controller device (31) to the data transmitter (1) in the additional can setup, to call up the resource occupation and configuration of the data transmitter (1), stored in the memory device (10), for a new allocation thereof in the additional call setup.

2. The method of claim 1, wherein the resource occupation and configuration of the data transmitter (1) stored in the memory device (10) of the data transmitter (1) are stored in memory temporarily.

3. The method of claim 1, resources that have just been released are not allocated by the controller device (31) until no other resources are available any longer.

4. The method of claim 1, wherein the resources that are first allocated again by the controller device (31) are those whose release occurred longer ago.

5. The method of claim 1, wherein an acknowledgment message (5) sent from the controller device (31) to the data transmitter (1) is acknowledged by the data transmitter to confirm a correct resource allocation.

6. The method of claim 1, wherein the instant of callup of the resource occupation and configuration of the data transmitter (1), stared in the memory device (10) of the data transmitter (1), form new allocation thereof in the additional call setup is predetermined.

7. An apparatus for an additional call setup for data transmission between a second data receiver (2') and a data transmitter (1) via at least one mobile telecommunications system (3), in which between the data transmitter (1) and the second data receiver (2') or a first data receiver (2), a first call setup has already taken place within a certain time period Δt in the past, and wherein the data transmitter (1) has at least one memory device (10), and the mobile telecommunications system (3) has at least one air interface (30) and one controller device (31), wherein the mobile telecommunications, system (3) has at least one controller device (31) for allocating resources of an air interface (30) to the data transmitter (1) and for constructing a certain configuration of the data transmitter (1) in the first call setup;

wherein the data transmitter (1) has at least one memory device (10) for storing the resource occupation and configuration of the data transmitter (1) of the first call setup in memory; and wherein the mobile telecommunications system (3) has a transmitter (33) for sending an identification message (7) from the controller device (31) to the data transmitter (1) in the additional call setup for calling up the resource occupation and configuration, stored in the memory device (10), of the data transmitter (1) for a new allocation thereof in the additional call setup.

8. The apparatus of claim 7, wherein the memory device (10) of the data transmitter (1) is embodied as a temporary memory device (10).

9. The apparatus of claim 7, wherein the mobile telecommunications system (3) is embodied as a UMTS (Universal Mobile Telecommunication System) system.

10. The apparatus of claim 7, wherein the data transmitter (1) is embodied as a mobile telephone (1).

11. The apparatus of claim 7, wherein the resources, for instance in a UMTS (Universal Mobile Telecommunication System) system, are defined as a combination of a CDMA (Code Division Multiple Access) code, a carrier frequency, and optionally a time slot of a corresponding transmission channel.

* * * * *